Feb. 2, 1960    I. ORTEGA ET AL    2,923,504
SAFETY LANDING PLATFORM FOR AIRCRAFT
Filed May 19, 1958    2 Sheets-Sheet 1

INVENTOR.
ISODORO ORTEGA
ALBERT WALLACE
BY Henry J. E. Metzler
ATTORNEY.

Feb. 2, 1960

I. ORTEGA ET AL 2,923,504

SAFETY LANDING PLATFORM FOR AIRCRAFT

Filed May 19, 1958

INVENTOR.
ISODORO ORTEGA
ALBERT WALLACE
BY

ATTORNEY.

United States Patent Office 2,923,504
Patented Feb. 2, 1960

2,923,504

SAFETY LANDING PLATFORM FOR AIRCRAFT

Isidoro Ortega, New York, and Albert Wallace, Bronx, N.Y.

Application May 19, 1958, Serial No. 736,166

4 Claims. (Cl. 244—114)

The present invention relates to an aeroplane station mechanically arranged in a comparatively small operating space to facilitate the reception and the discharge of flying planes.

Since airplanes, especially large commercial and military planes, can land and start safely only when very large expensive hard-surface landing strips are available, several attempts have been made to facilitate the landing and take-off by providing movable platforms, such as are described for instance in the Patent No. 1,824,346. However, these hitherto known devices are extremely expensive to provide, to operate, and to maintain in a satisfactory working condition, and they have accomplished little, if anything toward the important goal of reducing the dead weight and the cost of airplanes by eliminating any elements on the plane which are needed only for landing and taking off. The landing gear of a modern large plane increases the dead weight of a plane by several tons and is an expensive mechanism which, irrespective of its theoretical strength, is comparatively frail in relation to the violent shocks to which it is subjected during the landing operations under unfavorable weather, wind, and ground conditions. Moreover, the folding and unfolding mechanism of a landing gear frequently fails to operate, so that hazardous belly landings, due to a stuck landing gear, must be made, usually claiming personal injuries and property damage.

Therefore, one object of the present invention is the provision of a safety landing platform for aircraft which can be moved at the landing speed or at the take-off speed of an aircraft, so that a plane can land thereon or can take off therefrom without needing a landing gear, thus making it possible to build planes the payload of which can be increased substantially relative to the power of their engines, and which no longer are subject to the dangers of landing gear defects.

Another object of the present invention is the provision of a safety landing platform for aircraft which not only can be used by planes without wheels and landing gears but also by ordinary planes that have wheels, so that existing planes do not have to be changed in order to use our new and improved landing platform but can land on the same wherever available and can land also on places which have only the customary runways or air fields.

A further object of the present invention is the provision of a safety landing platform for aircraft which has a high degree of resiliency and is provided with shock absorbers and with means for preventing vertical movements, so that a sudden jumping or springing back of the platform will be avoided after the impact of the landing thereon of a heavy plane. In this way the safety of landing is considerably increased, for planes without wheels as well as for planes with wheels, so that no longer the landing will be the most dangerous phase of each flight, it having been estimated hitherto that seventy-five percent of all aircraft accidents occur while landing.

Yet still another object of the present invention is the provision of a safety landing platform for aircraft which normally is used in a specific channel structure or in a partially open tunnel on an airfield, so that its plane receiving surface is substantially flush with the rest of the air field, but which also can be driven out of said channel or open tunnel structure and can be used for overland transportation of heavy objects such as heavy guns or other military equipment, machinery, small buildings, or the like.

A still further object of the present invention is the provision of a safety landing platform for aircraft which is strong enough to resist the impact of oncoming planes irrespective of wind conditions, which is so constructed that its operation will not be impaired to any substantial extent by snow or ice, and which also can be constructed as a complete unit containing all the auxiliary equipment of a landing field, such as fire fighting equipment, water supply, ambulance space, repair items and the like.

With the foregoing and other objects in view which will appear as the description proceeds, the invention consists of certain novel details of construction and combinations of parts hereinafter more fully described and pointed out in the claims, it being understood that changes may be made in the construction and arrangements of parts without departing from the spirit of the invention as claimed.

In the accompanying drawing a preferred form of the invention has been shown.

In said drawing.

Similar reference characters refer to similar parts throughout the several views.

Figure 1:
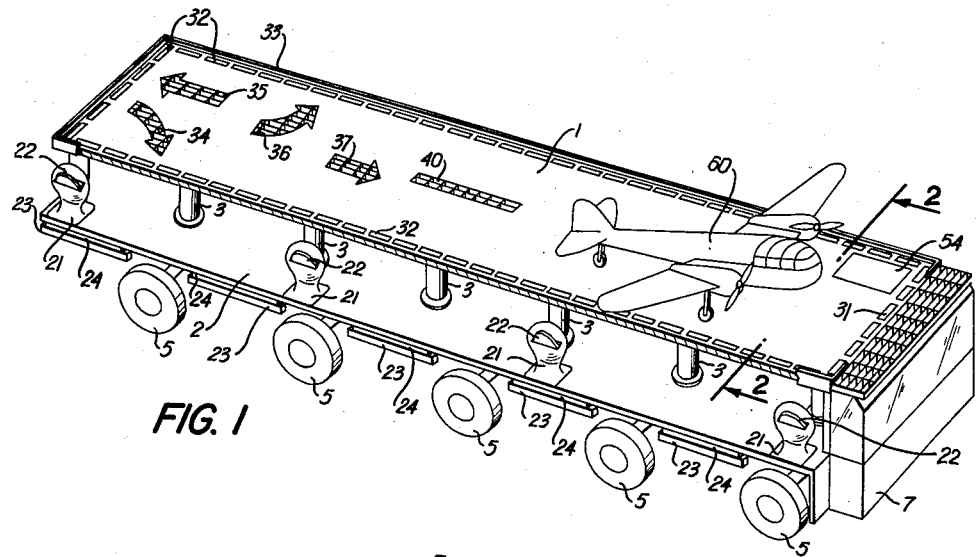
Figure 1 is a perspective view of a preferred embodiment of our invention.

In the drawings the numeral 1 denotes an aircraft carrying platform which preferably is made of re-inforced concrete or metal, although it might be made also of plastic material, wood, or the like. The numeral 2 denotes a lower platform, which may be made of the same or of a similar material as the platform 1. Mounted on the platform 2 are a plurality of upright cylinders 3, which are open at the top and into which are slidably extended plunger members 4 that carry the platform 1. Any suitable resilient and/or shock absorbing means, such as springs, or an air-cushion arrangement, are interposed between the members 3 and 4, tending to keep the platform 1 at a predetermined distance above the platform 2. The platform 2 is carried by wheels 5 in substantially the same manner as the loading surface of a large truck. By means of the wheels 5 the device can be driven, and a cabin 7 contains steering and speed controlling devices, as well as controls for a motor or for any other source of power for driving the wheels 5 and for steering the device.

Figure 2:
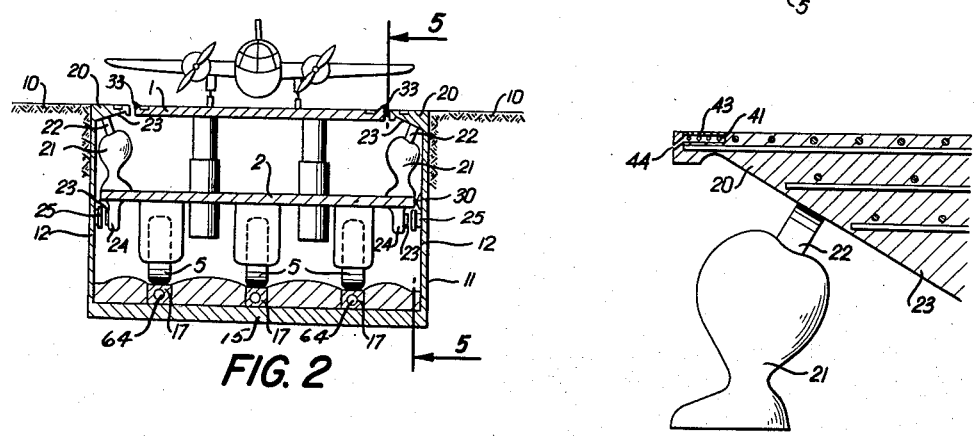
Fig. 2 is a cross-section view on the line 2—2 of Fig. 1.
Figure 3:
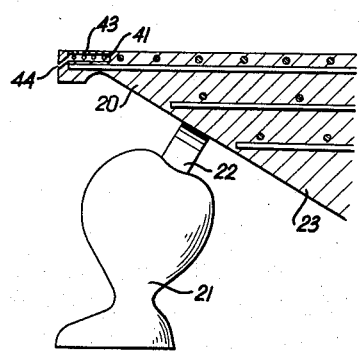
Fig. 3 is an enlarged detailed fractional cross sectional view of a top section of a channel in which our new and improved landing platform normally runs.
Figure 4:
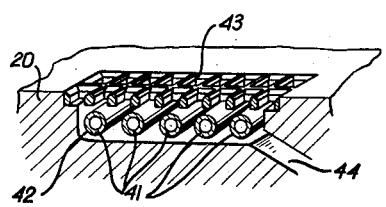
Fig. 4 is an enlarged fractional perspective detailed view of a lighting arrangement, partially in section on the line 4—4 of Fig. 1.
Figure 9:
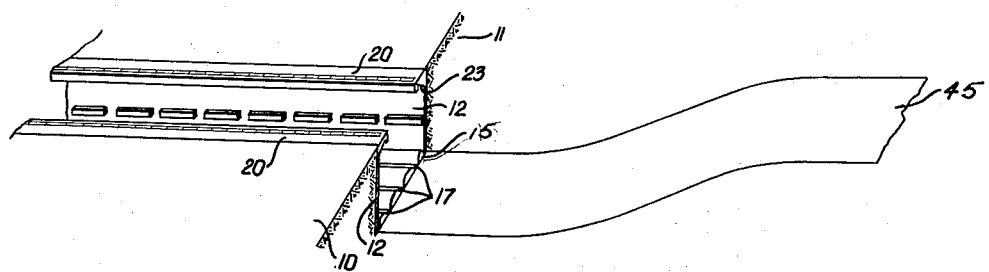
Fig. 9 is a fractional perspective view of an end portion of a channel or an open tunnel in which our landing platform normally is operated.

Although our new and improved safety landing platform for aircraft can be driven on broad roads or any-where where there is available sufficient space and a reasonably smooth surface, we prefer to have it operate in specifically constructed channels or open tunnels on landing fields. In the drawing the numeral 10 denotes the surface of a landing field into which is dug a long open channel 11 (Figs. 2 and 9). The major portions of the channel 11 are lined by retaining walls 12 and by a floor 15 of reinforced concrete or the like. The floor 15 preferably is provided with grooves 17 in which run the wheels 5, and the walls 12 preferably have inwardly overhanging portions 20, which may be triangular in cross-section or which may be of any other suitable shape or design. Thus our landing platform will run in a channel or in an open tunnel constructed substantially in accordance with the three-way high-speed run or tunnel disclosed by our co-pending patent application Serial No. 722,182, filed on March 18, 1958.

On the lower platform 2 there are mounted bearing bracket members 21 in which auxiliary wheels 22 are rotatable. The wheels 22 engage the inclined lower sides 23 of the overhanging channel portions 20, which preferably are made of re-inforced concrete or the like, so as to prevent a swinging or bouncing movement of the platform after the device has been hit by a heavy plane landing thereupon. The elements 21 and 22 are constructed and arranged in substantially the same manner as the corresponding elements of the side-and-upright drive for automobiles and the like of our co-pending patent application Serial No. 720,246, filed March 10, 1958.

Figure 5:
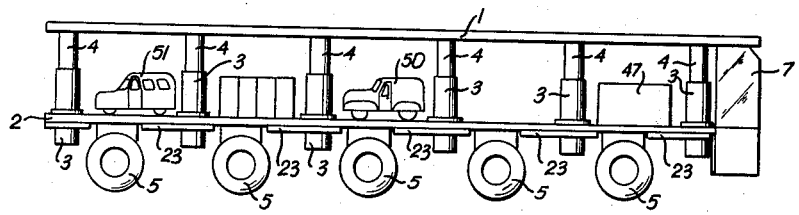
Fig. 5 is a longitudinal sectional view on the line 5—5 of Fig. 2.
Figure 7:
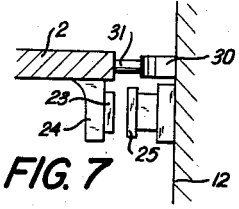
Fig. 7 is an enlarged fractional, detailed cross-sectional view of a brake arrangement.
Figure 8:
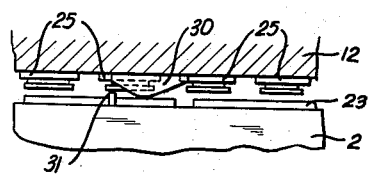
Fig. 8 is a fractional plan view of the brake arrangement of Fig. 7.
Figure 6:
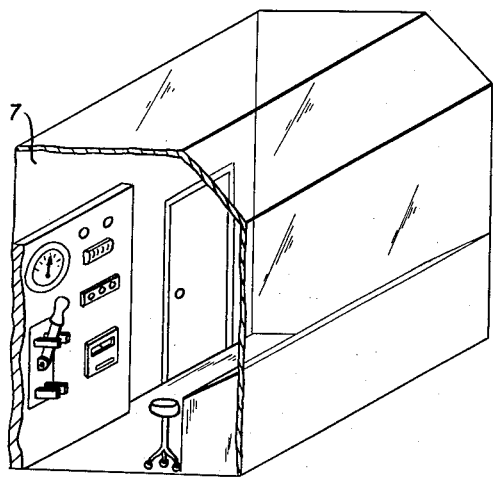
Fig. 6 is a detailed enlarged perspective view of an open fraction of a control cabin.

We also prefer to augment the effect of ordinary brakes on the wheels 5 of our new and improved safety landing platform for aircraft by any suitable additional breaking device interposed directly between the channel or open tunnel and one of the platforms 1 or 2. In Figs. 1, 2, 7, 8 and 9, a preferred form of this additional braking arrangement is illustrated. There it will be seen that bars 23 of a metal that can be attracted by a magnet are secured to the lower edge portions of the platform 2 by means of brackets 24 intermediate each wheel axis, at both sides of the platform 2, and a plurality of electro magnets 25 constructed and arranged for attracting the bars 23 are mounted on the walls 12 in a portion of the channel 11. The magnets 25 are provided only in an end portion of the channel 11, for instance if the channel 11 is three miles long, the last mile of its length is provided with these magnets 25, so as to constitute a magnetic braking device, which will increase the safety of our safety landing platform for aircraft and which also will make it possible to make the channel 11 shorter than it safely would have to be were no provisions made for such a powerful magnetic braking arrangement. The operation of the magnets 25 can be controlled by any suitable means, for instance by means of some electronic radio control devices in the cabin 7, or by any suitable automatic device such as a switch 30 mounted on a wall 12 and adapted for being engaged by a striking element 31 mounted on the platform 2. The platform 1 preferably is provided with rim lights 32 beneath heavy transparent plates of glass or plastic material, as well as with rim elevations 33, with colored light arrangements 34, 35, 36 and 37 for indicating the direction of prevailing winds, and with a colored speed indicating lights arrangement 40. The edge portions of the overhanging channel wall portions 20 preferably are provided with light tubes 41 placed in grooves 42 and covered by grills 43. Each groove 42 preferably is provided with a weep hole or pipe 44 for permitting drainage of rain water or cleaning water or the like. The ends of the channel 11 have inclined portions 45 (Fig. 9) for permitting the device to drive out of, and into, the channel 11. The space between the platforms 1 and 2 can be utilized for placing thereon supplies and auxiliary equipment, such as a supply 47 of water or for any other fire exteinguishing medium, a service truck or jeep 50, an ambulance 51, and the like (Fig. 5). Also an elevator 54 preferably is provided for getting one of the vehicles 50 and 51 quickly up to the platform 1. An operator's cabin 7 can be on both ends of the device or only on one end as shown. In order to prevent the formation of ice and/or snow accumulations in the channel 11 we prefer to provide pipes 64 beneath the grooves 17, so that steam or any other suitable heating fluid can be forced therethrough whenever necessary for the purpose of keeping the temperature above the freezing point.

When a plane which is to land upon our safety landing platform for aircraft approaches, one of the wind direction indicators 34, 35, 36 or 37 is illuminated and the device starts moving, thereby indicating its speed continuously, as it increases in speed, on the indicator 40. The operators of our new and improved safety landing platform for aircraft are constantly in contact with the pilot of the plane by radio intercommunication devices, and when the plane is closely above the platform 1 and the device has synchronized its speed to that of the plane, the pilot allows the plane to drop upon the platform 1. Thereafter the operator in the cabin 1 reduces the speed of our landing device, and as soon as the platform 2 has reached the switch 30, the element 31 tips the switch 30 and causes the powerful magnets 25 to exert a strong braking action upon the elements 23, so that the landing device with an airplane 60 on it will come to a safe stop before it has reached the end of the channel 11.

When taking off, the landing device will be accelerated to a predetermined speed at which the plane gets off the platform 1, so that the engines of the plane will not have to operate at their maximum speed until the landing device has reached the take-off speed. This will reduce the consumption of fuel carried by the plane and it also will reduce to a certain extent the plane noise at the landing field.

Since certain changes may be made in the above article and different embodiments of the invention could be made without departing from the scope thereof, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention which as a matter of language might be said to fall therebetween.

Having thus fully described our said invention, what we claim as new and desire to secure by Letters Patent is:

1. A safety landing and take-off device for aircraft comprising a first platform carried by wheels, a second platform adapted for receiving a landing airplane, upright cylinders mounted on said first platform, plungers mounted on said second platform and slidably extended into said cylinders, resilient means interposed between said cylinders and said plungers, and means for moving said platforms at a speed equal to the landing speed of an airplane, so that a plane can land on said first platform while the same is moving at the plane's landing speed.

2. A safety landing and take-off device for aircraft comprising a first platform carried by wheels, a second platform adapted for receiving a landing airplane, upright cylinders mounted on said first platform, plungers mounted on said second platform and slidably extended into said cylinders, resilient means interposed between said cylinders and said plungers, means for propelling said platforms at a speed equal to the landing speed of an airplane, a channel adapted for receiving said platforms having inwardly overhanging inclined upper edge portions the top sections of which are flush with said second platform, auxiliary wheels obliquely upwardly extended from said first platform engaging the lower sides of said upper edge portions of said channel, and braking means interposed between said channel and said platforms.

3. A safety landing and take-off device for aircraft comprising a first platform carried by wheels, a second platform adapted for receiving a landing airplane, upright cylinders mounted on said first platform, plungers mounted on said second platform being slidably extended into said cylinders, resilient means interposed between said plungers and said cylinders, means for driving the wheels carrying said first platform, a channel slightly wider than said first platform having a depth equal to the aggregate height of said platforms and having grooved bottom portions adapted for receiving the wheels carrying the first platform and being provided with inwardly protruding upper edge portions which have upwardly inclined lower sides and level upper sides that are flush with the top of the second platform, said second platform being narrower than said first platform so as to fit in between said inwardly protruding upper edge portions of said channel, auxiliary wheels obliquely and upwardly extended from said first platform engaging the lower sides of said upper edge portions of said channel and braking means interposed between said channel and said first platform.

4. A device of the character described comprising a vehicle consisting of a first platform carried by wheels, a second platform of a lesser width than said first platform being adapted for receiving a landing airplane, upright cylinders mounted on said first platform, plungers mounted on said second platform being slidably extended into said cylinders, resilient means interposed between said cylinders and said plungers, means for propelling said vehicle at a speed equal to the landing speed of an airplane; a channel slightly wider than said first platform and being as deep as said vehicle is high and having side walls as well as grooved bottom portions adapted for receiving the wheels carrying said first platform and being provided with inwardly protruding upper edge portions which have upwardly inclined lower sides and level upper sections which are flush with the top of said second platform, auxiliary wheels obliquely and upwardly extended from said first platform engaging the lower sides of said upper edge portions of said channel, magnets provided on portions of the side walls of said channel, and magnetically attractable elements on said platforms adapted for being attracted by said magnets for exerting a braking action on said vehicle.

References Cited in the file of this patent

UNITED STATES PATENTS

| 1,803,320 | Christianson | May 5, 1931 |
| 2,399,461 | Brown | Apr. 30, 1946 |

FOREIGN PATENTS

| 536,410 | France | Feb. 10, 1922 |
| 763,907 | France | Feb. 19, 1934 |